United States Patent [19]

Ishimoto et al.

[11] Patent Number: 5,747,419
[45] Date of Patent: May 5, 1998

[54] PLANT GROWING AGENT COMPRISING IRON FERROCYANIDE COMPLEXES AND PLANT GROWING METHOD

[75] Inventors: Shoichi Ishimoto; Toshio Hattori, both of Tokyo, Japan

[73] Assignee: Ishimoto Agri-Tech Research Corp., Tokyo, Japan

[21] Appl. No.: 790,364

[22] Filed: Jan. 28, 1997

[30] Foreign Application Priority Data

Jan. 31, 1996 [JP] Japan .................. 8-037349

[51] Int. Cl.$^6$ .................. A01N 59/16; C05C 9/00; C05D 9/02
[52] U.S. Cl. .................. 504/187; 71/31; 71/61
[58] Field of Search .................. 504/187; 71/31, 71/61

[56] References Cited

U.S. PATENT DOCUMENTS 4,334,905 6/1982 Wagner et al. .................. 71/27
5,002,601 3/1991 Buscall et al. .................. 71/28

OTHER PUBLICATIONS

Mauseth, James D. *Botany: An Introduction to Plant Biology.* Saunders College Pub. pp. 77, 78, 122. 1995.

*Primary Examiner*—S. Mark Clardy
*Attorney, Agent, or Firm*—Rogers & Killeen

[57] ABSTRACT

A plant growing agent contains a blue pigment that contains, as a main ingredient, a compound represented by MFe[Fe(CN)$_6$] (M is an alkali metal or an ammonium group, and one Fe is of divalent, while the other Fe is of trivalent), and a substance for changing the cuticular of the surface layer of a plant so as to facilitate permeation of the blue pigment into the interior of the tissue of the plant. In a plant growing method, a thick stock solution is first prepared by adding a surfactant and a solvent into a mixture of the above-described blue pigment and the above-described substance for changing the cuticular of the surface layer of a plant so as to facilitate permeation of the blue pigment into the interior of the tissue of the plant. The thick stock solution is diluted 5–100 times with a solvent, and is sprayed onto a plant to be grown.

10 Claims, No Drawings

PLANT GROWING AGENT COMPRISING IRON FERROCYANIDE COMPLEXES AND PLANT GROWING METHOD

BACKGROUND OF THE INVENTION

1. Field of the Invention

The present invention relates to a plant growing agent and a plant growing method, and more particularly to a plant growing agent and a plant growing method that can improve the growth of a young plant while increasing the amount of chlorophyll in the plant.

2. Description of the Related Art

Recently, in cultivation of general crops, there has become popular a method in which seeds are sown on artificial soil, and are allowed to germinate and grow.

However, it was found that in such nurturing of a plant on artificial soil, the color of leaves becomes pale, and lack of chlorophyll occurs. It is considered that the cause of the lack of chlorophyll is insufficient amount of iron.

In the case of a rice plant among a variety of crops, when it is grown in an irrigated rice field, the rice plant does not encounter a problem of insufficient iron, because the rice field contains a large amount of iron (in a dissolved state). Since the rice plant has been adapted, by nature, to nurturing in a rice field or similar environment, which contains a large amount of dissolved iron, the rice plant is extremely sensitive to lack of iron. Lack of iron—or iron deficiency—causes yellowing of the rice plant due to lack of chlorophyll. This is an essential problem to be solved.

When an iron salt is added to artificial soil, the problem of insufficient chlorophyll due to iron deficiency can be partially solved. However, since the iron salt is generally very slightly soluble in soil, sufficient effect cannot be obtained.

SUMMARY OF THE INVENTION

In order to solve the above-described problems, the inventors of the present invention attempted to increase the amount of chlorophyll through direct spraying of a blue pigment such as Berlin blue, or turnbull blue, onto leaves or the like of a plant, but the inventors could not solve the above-described problems because of insufficient permeation of the blue pigment into the leaf surfaces.

The inventors further continued the studies and eventually found that when they used the above-described blue pigment in combination with a substance which changed the cuticular of the surface layer of a plant to thereby facilitate permeation of the blue pigment into the plant tissue, not only the amount of chlorophyll but also the dry weight of the plant increased, so that damage during transplantation was prevented, low-temperature resistance was given, and roothold was promoted. The present invention was accomplished based on this finding.

Accordingly, an object of the present invention is to provide a plant growing agent and a plant growing method that increase the dry weight of a plant and the amount of chlorophyll so as to prevent damage during transplantation, to provide low-temperature resistance, and to promote roothold.

Novel features of the present invention are set forth in the appended claims. However, the present invention itself, and further objects and advantages thereof will become clearer by the following description of the present invention and preferred embodiments thereof.

DESCRIPTION OF THE INVENTION AND PREFERRED EMBODIMENTS

The blue pigment contained in a plant growing agent according to the present invention contains, as a main ingredient, a compound represented by the following formula:

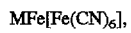

$$MFe[Fe(CN)_6],$$

wherein M is an alkali metal (e.g., Na or K) or an ammonium group, with an ammonium group being preferred.

A specific example of the above compound is $NH_4Fe(II)Fe(III)(CN)_6$.

The popular names of compounds represented by the above formula are Berlin blue (Prussian blue), turnbull blue, and berlinate.

Berlin blue is typically obtained through a reaction between a solution of a ferrocyanide and Fe(III), while turnbull blue is typically obtained through a reaction between a solution of a ferricyanide and Fe(II).

In the present invention, the blue pigment may be composed solely of Berlin blue or the like; however, any other kind of a blue pigment may be added insofar as the object of the present invention can be achieved.

The substance that is contained in the plant growing agent of the present invention and that changes the cuticular of the surface layer of a plant so as to facilitate permeation into the interior of the plant tissue acts such that linkage among the molecules of cutin—which is a main component of hard and thick cuticular cells that are formed as a result of transformation of epidermal cells of a plant into cuticular—is affected so as to loosen the cuticular membrane structure. As a result, the ingredients of the plant growing agent sprayed on the plant easily permeate from the surfaces of leaves into the interiors thereof.

Although urea is preferably used as said substance that transforms the cuticular of the surface layer of a plant so as to facilitate permeation into the interior of the plant tissue, other nitrogen-containing compounds may be used, as long as they provide a similar effect. Examples of such nitrogen-containing compounds include ammonia, nitric acid, fixed nitrogen, ammonium sulfate, and ammonium chloride.

Preferably, the plant growing agent according to the present invention contains a trace element. In this specification, the term "trace element" means an element that provides an effect on the growth of a plant when it is used in a very small amount. Examples of such trace elements include Mn, Fe, Cu, B, Mo, and Zn.

Preferably, the plant growing agent according to the present invention contains saccharide. As used herein, saccharides are those that contain glucose, such as sucrose and fructose, among which sucrose is preferable. Saccharide is particularly effective in the case where the absorption of blue pigment into the interior of a plant decreases due to poor conditions such as low temperature. In such a case, saccharide acts as an energy source within cells of the plant, thus assisting and promoting the absorption of the plant growing agent into the interior of the plant. This further enhances the effects of the plant growing agent according to the present invention.

The plant growing agent of the present invention is manufactured as follows.

Into a mixer are added 100 parts by weight of said blue pigment and 10–200 parts (preferably 10–100 parts) by weight of a substance that changes the cuticular of the surface layer of a plant so as to facilitate permeation into the interior of the plant tissue. Subsequently, 1–50 parts (preferably, 1–30 parts) by weight of a surfactant, and a solvent (e.g., water) are further added. These ingredients are then mixed and stirred so as to obtain a thick stock solution. Preferably, a saccharide and a trace element are added during the preparation of the plant growing agent before addition of the surfactant.

For use, the plant growing agent of the present invention is diluted 5–100 times with water.

If the plant growing agent of the present invention contains a saccharide, it is preferred that the concentration of the saccharide at the time of use be equal to or less than 0.5%, preferably around 0.3%.

The present invention encompasses both plant growing agents in the form of a thick stock solution and diluted solutions of the thick stock solutions. However, in order to obtain the intended performance and effects, it is preferred that the plant growing agent be transported in its undiluted state so as to prevent deterioration due to elapse of time, and be subsequently diluted for use.

The surfactant used in the present invention serves as a dispersing agent for dispersing said blue pigment, said substance that changes the cuticular of the surface layer of a plant so as to facilitate permeation into the interior of the plant tissue, and other substances such as a trace element. The surfactant also serves as a spreading agent for causing the plant growing agent of the present invention to uniformly adhere to the leaves and stem of a plant so as to sufficiently obtain the effects of the plant growing agent.

No limitations are imposed on the kind of the surfactant, and various kinds of nonionic surfactants may be used singly or in combination such that the above-described effects are obtained.

The plant growing agent of the present invention may contain, in addition to the above-described components, an organic acid or the like. Like saccharide, the organic acid acts as an energy source within cells of the plant and promotes absorption of the plant growing agent into the interior of a plant, so that the effects of the plant growing agent of the present invention are further enhanced.

When the present invention is applied to nurturing of, for example, a rice plant on artificial soil, the above-described diluted plant growing agent is sprayed onto the rice plant.

The present invention is applicable to any kind of soil that tends to cause iron deficiency. In addition to the case where artificial soil is used, the present invention can be applied to the case where a plant is grown on calcareous soil that broadly spreads in arid and semi-arid zones on the earth. The present invention is also preferably applied to soil in which iron is present in a sufficient amount but is difficult for plants to absorb through their roots due to some causes. Moreover, the present invention provides effects on the growth of plants in an environment that requires the plants to have cold resistance.

EXAMPLES

Examples of the present invention will now be described, but the invention is not limited to the examples.

EXAMPLE 1

Preparation of Plant Growing Agents of the Present Invention

Plant growing agents 1–3 according to the present invention were prepared as follows:

(Plant growing agent 1):

$NH_4Fe(II)Fe(III)(CN)_6$ 100 parts by weight urea 30 parts by weight surfactant 20 parts by weight The above-described ingredients were mixed, and water was added to make the total volume 1 liter. The mixture was subsequently stirred to obtain a thick stock solution, which was diluted 20 times with water. This dilution was used as a plant growing agent 1.

(Plant growing agent 2):

Plant growing agent 2 was prepared in the same manner as for the plant growing agent 1, except that a trace element was further added.

(Plant growing agent 3):

Plant growing agent 3 was prepared in the same manner as for the plant growing agent 1, except that 30 parts by weight of a saccharide was further added.

Test and Evaluation

Seeds (100g) of a rice plant (variety: koshihikari) were sown on commercially available artificial soil for growth of young plants within a plant nurturing container. This plant nurturing container was placed in a thermostatic chamber for plant growth until most of the seeds had budded. Subsequently, the seeds were divided into five groups. Three of them were used in a test of the agents of the present invention, while the remaining two were used for comparison, which will be described herein below.

Each of the plant growing agents 1 through 3 of the present invention was sprayed on the leaves of the rice plants corresponding to one of the three groups.

After spraying, the rice plants were cultivated at 20° C. Twenty five days later, the amount of chlorophyll at the surface of each of the first and second leaves of a rice plant was measured through use of a chlorophyll meter SPAD501 (product of Minolta Camera Co.). The results of the measurement are shown in Table 1.

Comparative Example 1

Nurturing test and measurement were performed in the same manner as in Example 1, except that none of the plant growing agents of the present invention were used. The results of the measurement are shown in Table 1.

Comparative Example 2

A comparative plant growing agent was prepared in the same manner as for the plant growing agent 1 except that urea was excluded. This comparative plant growing agent was sprayed on leaves of rice plants for comparison. The amount of chlorophyll was measured in the same manner and conditions as those used in Example 1. The results of the measurement are shown in Table 1.

TABLE 1

| | value of SPAD | |
|---|---|---|
| | first leaves | second leaves |
| Example 1 | | |
| Plant growing agents 1 | 3.7 | 3.6 |
| Plant growing agents 2 | 3.8 | 3.7 |
| Plant growing agents 3 | 4.0 | 3.9 |
| Comparative Example 1 | 3.0 | 2.9 |
| Comparative Example 2 (comparative plant growing agent) | 3.3 | 3.2 |

EXAMPLE 2

When 25 days passed after the nurturing tests in Example 1 and Comparative Examples 1 and 2 had been started, measurement was conducted to determine the number of leaves, the dry weight of the leaves and stem, and the height of a rice plant. A completeness index (dry weight of leaves and stem/height) that indicates the growth of rice plants was calculated from the dry weight of the leaves and stem of a rice plant and the height of the rice plant. The results of the calculation are shown in Table 2.

TABLE 2

|  | number of the leaves | dry weight of the leaves and stem(A) (g) | height (B) (cm) | completeness index (A/B) |
| --- | --- | --- | --- | --- |
| Example 1 |  |  |  |  |
| Plant growing agents 1 | 2.3 | 9.5 | 11.6 | 0.82 |
| Plant growing agents 2 | 2.4 | 9.7 | 12.0 | 0.81 |
| Plant growing agents 3 | 2.5 | 9.9 | 12.1 | 0.82 |
| Comparative Example 1 | 1.9 | 8.2 | 11.3 | 0.73 |
| Comparative Example 2 (comparative plant growing agent) | 2.0 | 8.5 | 11.4 | 0.75 |

As is apparent from Table 2, the plant growing agent of the present invention increases not only the amount of chlorophyll but also the completeness index (dry weight of leaves and stem/height). Accordingly, it is possible to prevent damage during transplantation, to provide low-temperature resistance, and to promote roothold.

EXAMPLE 3

Plant growing agent 3 prepared in Example 1 was sprayed onto rice plants that had been grown in the same manner as in Example 1. The rice plants were then grown while the temperature was lowered to 10° C.

Regardless of the bud conditions (low temperature), the amount of chlorophyll and the completeness index that indicated the degree of growth of the rice plants were almost the same as those obtained in Example 1, wherein rice plants were grown at a normal temperature of 20° C. This demonstrates that addition of a saccharide assists growth of rice plants at low temperatures.

Since the dry weight of each plant is increased, it becomes possible to assist growth of a rice plant under lower temperatures and low sunlight conditions, as well as to assist growth of other young plants of vegetables, flowers, decorative plants and the like.

What is claimed is:

1. A plant growing agent comprising:

a blue pigment that contains, as a main ingredient, a compound represented by the following formula:

$$MFe[Fe(CN)_6],$$

(wherein M is an alkali metal or an ammonium group, and one Fe is of divalent, while the other Fe is of trivalent); and a substance for changing the cuticular of the surface layer of a plant so as to facilitate permeation of the blue pigment into the interior of the tissue of the plant.

2. A plant growing agent according to claim 1, wherein the substance for changing the cuticular of the surface layer of a plant so as to facilitate permeation into the interior of the tissue of the plant is urea.

3. A plant growing agent according to claim 1, further comprising a trace element.

4. A plant growing agent according to claim 1, further comprising a saccharide.

5. A plant growing agent according to claim 1, further comprising a trace element and a saccharide.

6. A plant growing method comprising the steps of:

preparing a thick stock solution by adding a surfactant and a solvent into a mixture of a blue pigment that contains, as a main ingredient, a compound represented by the following formula:

$$MFe[Fe(CN)_6],$$

(wherein M is an alkali metal or an ammonium group, and one Fe is of divalent, while the other Fe is of trivalent), and a substance for changing the cuticular of the surface layer of a plant so as to facilitate permeation of the blue pigment into the interior of the tissue of the plant;

diluting the thick stock solution 5–100 times with a solvent; and spraying the diluted solution onto a plant to be grown.

7. A plant growing method according to claim 6, wherein 100 parts by weight of $NH_4Fe(II)Fe(III)(CN)_6$ is used as said blue pigment, and 10 to 200 parts by weight of urea is used as said substance for changing the cuticular of the surface layer of a plant so as to facilitate permeation of the blue pigment into the interior of the tissue of the plant.

8. A plant growing method according to claim 6, wherein said thick stock solution contains a trace element.

9. A plant growing method according to claim 6, wherein said thick stock solution contains a saccharide, and when said thick stock solution is diluted for use, the concentration of the saccharide is equal to or less than 0.5%.

10. A plant growing method according to claim 6, wherein said thick stock solution contains a trace element and a saccharide, and when said thick stock solution is diluted for use, the concentration of the saccharide is equal to or less than 0.5%.

* * * * *